United States Patent
Goh et al.

(10) Patent No.: US 6,688,230 B2
(45) Date of Patent: Feb. 10, 2004

(54) METHOD OF PRINTING A TOKEN BY A PRINTER

(75) Inventors: Cheh Goh, Bristol (GB); Marco Casassa Mont, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/270,322

(22) Filed: Oct. 15, 2002

(65) Prior Publication Data

US 2003/0084809 A1 May 8, 2003

(30) Foreign Application Priority Data

Oct. 13, 2001 (GB) .............................................. 0124633

(51) Int. Cl.7 ................................................. B41F 1/54
(52) U.S. Cl. ....................... 101/484; 713/176; 713/185; 713/200; 705/64; 705/50; 705/51
(58) Field of Search ................................ 101/484, 483, 101/DIG. 46; 713/176, 179, 180, 182, 185, 159, 200, 201, 202; 358/1.9, 1.1, 1.15; 455/557; 709/203, 229, 231, 226, 310; 705/64, 50, 65, 66, 51, 67

(56) References Cited

U.S. PATENT DOCUMENTS

| | | | |
|---|---|---|---|
| 5,633,932 A | * | 5/1997 | Davis et al. ................ 713/176 |
| 6,236,971 B1 | * | 5/2001 | Stefik et al. .................... 705/1 |
| 6,314,521 B1 | * | 11/2001 | Debry ........................ 713/201 |
| 6,378,070 B1 | * | 4/2002 | Chan et al. ................. 713/155 |
| 6,385,728 B1 | * | 5/2002 | DeBry ........................ 713/201 |
| 6,477,580 B1 | * | 11/2002 | Bowman-Amuah ......... 709/231 |
| 2002/0018235 A1 | * | 2/2002 | Ryan ........................ 358/1.15 |
| 2002/0097407 A1 | * | 7/2002 | Ryan et al. .................. 358/1.1 |
| 2002/0161430 A1 | * | 10/2002 | Vardi et al. ................. 709/310 |
| 2002/0169002 A1 | * | 11/2002 | Imbrie et al. ............... 455/557 |
| 2003/0014368 A1 | * | 1/2003 | Leurig et al. ................. 705/64 |
| 2003/0066878 A1 | * | 4/2003 | Mahoney et al. ........... 235/380 |
| 2003/0115144 A1 | * | 6/2003 | Stefik et al. .................. 705/51 |

* cited by examiner

Primary Examiner—Eugene H. Eickholt
(74) Attorney, Agent, or Firm—Hewlett-Packard Company

(57) ABSTRACT

A method of printing a token by printer (5), in which the printer (5) includes a digital identification device (1) configured to generate a series of distinct print job counter numbers and to provide a public key of a cryptographic public key/private key pair. The method includes the steps of sending a printer generated print job counter number and an encryption key to a token issuer (4) the token issuer (4) sending to the printer (5) a message encrypted by the encryption key, the message including the print job counter number and information representative of the token (9) to be printed and the printer (5) decrypting the encrypted message and printing the token using the information representative of the token (9) if the print job counter number is valid.

29 Claims, 3 Drawing Sheets

METHOD OF PRINTING A TOKEN BY A PRINTER

BACKGROUND OF THE INVENTION

1. Field of the Invention

The present invention relates to a method of printing a token by a printer.

2. Description of Related Art

When web users make a purchase of a ticket (a specific example of a token) via the internet, a physical ticket is usually made available for later use at a location where a show of possession of the ticket is needed. For example, when a user purchases a theatre ticket, the ticket may be dispatched by post to an address specified by the user, a reference number may be made available for the collection of a ticket from an agent physically or geographically nearby, upon showing some proof of identity such as a credit card, or the user may retrieve the ticket from the theatre upon showing the credit card used for purchase of the ticket which has the name of the user on it.

There are many potential inconveniences associated with these known approaches. A posted ticket may be lost in the post or delayed. When the ticket is provided to an agent, a loss of reference or an administrative error in sending the ticket to the agent can result in failure of the transaction. A ticket to be given to a third party cannot be handed over in advance of a theatre performance without going through one of the first two steps, which may fail. If to be collected at the venue, the user needs to be at the entrance of the venue early to collect pre-booked tickets and may fail to collect it through not having the correct credit card, lateness or a long queue.

The present applicant has identified a need to provide an improved approach to issuing a physical token to, for example, an internet user.

SUMMARY OF THE INVENTION

According to an embodiment of the invention, a method of printing a token by a printer includes use of a printer which includes a digital identification device configured to generate a series of distinct print job counter numbers and to provide a public key of a cryptographic public key/private key pair. The method includes the steps of sending a printer-generated print job counter number and an encryption key to a token issuer. The token issuer then sends to the printer a message encrypted by the encryption key, the message including the print job counter number and information representative of the token to be printed. The printer decrypts the encrypted message and prints the token using the information representative of the token if the print job counter number is valid.

The producer of the printer could be a trusted party who promises to fulfil and guarantee the requirements of both the ticket purchaser and the seller. The digital identification device could be embedded in the printer hardware as a printer identity module (PIM) unique to the printer similar to the SIM of a mobile telephone. Other means to provide the digital identification could be employed, for example a personal smart card with a personal digital certificate provided by a trusted certifying authority. The present invention is not confined to any particular approach to providing a digital identification device of the required functionality.

The encryption key may be the public key, which may be presented in the form of a digital certificate signed by the printer manufacturer. The encryption key may be a symmetric session encryption key and the method may include using the public key as an enveloping key for sending the symmetric session key to the token issuer securely.

Embodiments of the ticket printing system of the present invention will generally involve three parties. First, there is the ticket issuer who receives a payment for one or more tickets to be presented physically at a future point in time. Second, there is the purchaser who has paid for the tickets online who can print the tickets immediately for physical possession. Third, there is the venue entrance controller who will provide to the ticket holder services on presentation of the tickets. The venue entrance controller could also be the ticket issuer.

Embodiments of the invention may provide, from the token issuer's point of view, that the number of tickets printed is exactly as mandated by the issuer/server; the tickets are only printable on the printer designated by the purchaser; the printer is able to confirm to the issuer the physical completion of the printing; and no record of the mapping between the ticket and the buyer is kept. These assurances are obtainable by use of the trusted printer with the required functionality built into it in a secure, non-tamperable fashion including physical tamper-proof provision in known manner. The digital identification device may include a trusted party's digital certificate transmittable on request to the token issuer to confirm the printer has the required security.

Embodiments of the invention may provide, from the buyer's point of view, that the issuer cannot repudiate the authorisation of number of tickets for print; there are mechanisms to ensure that printer failure, ie., running out of paper or ink, jammed machine, power failure and so forth will be accounted for and the ticket will be printed as expected; the physical ticket is printed on standard office paper; and the physical ticket cannot be copied easily or quickly. For example, the printer can be arranged to generate a print fail indication which the token issuer will trust indicates the token has not been printed and that the transaction can be properly cancelled. Embodiments of the invention may provide, from the service provider's point of view, that the physical ticket can easily be identified to be genuine, no additional information (such as that in a data base), apart from that on the ticket, is needed to verify the ticket; and the physical ticket cannot be copied easily or quickly. The second of the two requirements is the same as that of the ticket buyer.

The encrypted message sent from token issuer may include information representative of the number of tokens, each according to the information representative of the token to be printed in the encrypted message, are to be printed by the printer. The printer then prints the number of tokens indicated by the information representative of the number of tokens to be printed in the encrypted message. This permits a single user to buy a number of tickets to an event in one transaction.

The encrypted message may include information representative of a replication resistant marking applicable to the token. The replication resistant marking for the token may be applied by the printer. These could be digital, printable watermarks of known type, for example.

The printer may send an acknowledgement to the token issuer that the entire printing of the token has been completed. The acknowledgement may be digitally signed using the private key of the printer. The acknowledgement may include all or part of the information representative of the token to be printed provided by the token issuer or other information by which the token issuer can confirm the tokens printed are those of that particular transaction. When the acknowledgement is verified by the token issuer a database may be updated to indicate that that token has been issued so the token issuer knows that that token should not be reissued. The messages between the printer and token issuer may be mediated by the token receiver's own computer system, for example a home computer system. The computer system may run an application program and a printer driver program. In this case the token receiver may input a command to the application indicating a printed token is desired. The application may then request the printer, via the printer driver, to provide the print job counter number and public key, the application sending the print job counter number and public key to the token issuer, and the application receiving the encrypted message from the token issuer and sending it to the printer via the printer driver. The printer and token issuer may be in communication at least in part via the internet.

The application could be a plug-in for a web browser and configured to establish and mediate communications between the token buyer's system and the token issuer's computing system, via the internet, for example.

It can be seen that, in general terms, the present invention provides a cryptographic solution to token printing, providing a secure business process which is suited also to a digital information rendering machine which is required to make one time deliveries to the subscriber.

Other aspects and advantages of the invention will become apparent from the following detailed description of exemplary embodiments taken in conjunction with the accompanying drawings.

DETAILED DESCRIPTION OF EMBODIMENTS OF THE INVENTION

Figure 1:
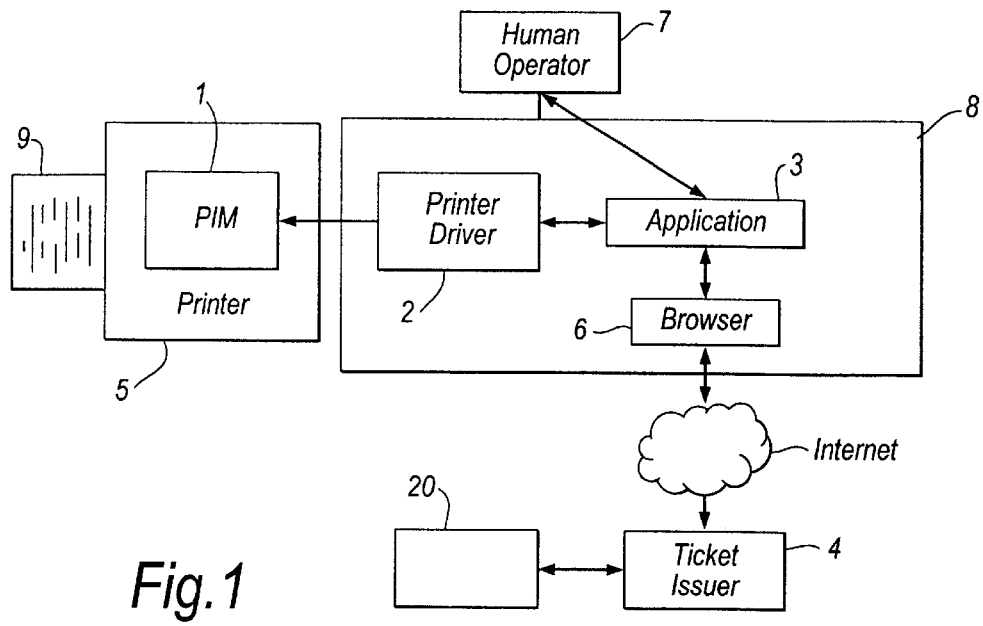
FIG. 1 is a schematic block diagram of a first system for carrying out the method of the present invention.
Figure 2:
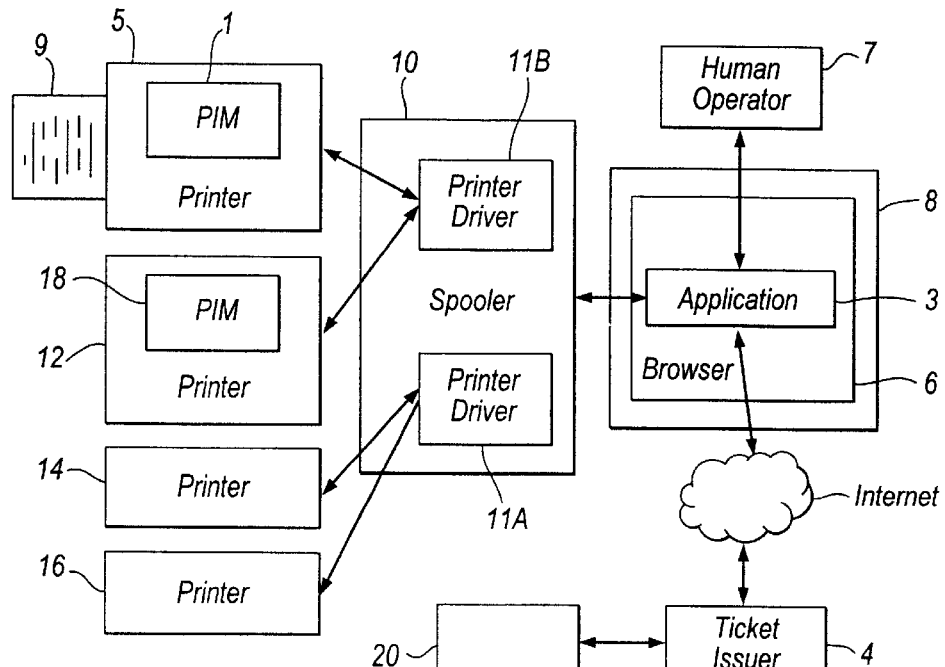
FIG. 2 is a schematic block diagram of a second system for carrying out the method of the present invention.

Referring to FIGS. 1 and 2, systems suitable for carrying out the present invention includes a printer identity module (PIM) 1, a printer driver 2, an application 3 that initiates secure printing, and a ticket issuer 4. The PIM 1 is part of a printing device 5 and the driver 2 and the application 3 reside in a computer system 8. The application is optionally associated with an internet browser 6 running on the computer system 8.

The PIM 1 is a digital identification device, similar to that of the Subscriber Identity Module (SIM) card in digital mobile phones. Stored inside the PIM are cryptographic key pairs such as those widely used for encryption and digital signing. The PIM also has a counter that generates a series of distinct counter numbers each to be associated with each of a respective series of print requests.

A given counter number and the public key of the PIM will be exported to the printer driver 2 when requested by the printer driver 2.

In the process of a web-based transaction that involves the issuing of a physical token, such as a ticket to a football match or a ticket to the theatre, the conclusion of the online interaction normally ends with the payment by the ticket purchaser, without getting the physical ticket immediately. The present invention provides that the physical ticket is obtained using the printer 5 associated with the machine 8 on which the browser application 6 runs, perhaps connected indirectly via a print spooler. The printer may be directly connected and networked to the computer system 8. A networked printing scenario implies that one or more machines embodying the features of printer 5, as well as conventional printers without a PIM, are networked together. These two cases will be considered separately with reference to FIGS. 1 and 2, respectively.

In each case, upon the receipt of payment by way of a credit card, say, the ticket issuer 4 will ask the human operator 7 who purchases one or more tickets whether the tickets are to be printed immediately on a printer connected to the computer system 8 and which runs browser 6. If the human operator's reply is affirmative, then the application 3, such as a plug-in for the browser, will start the trusted printing. At this point, the communication channel between the browser 6 and the issuer 4 is assumed to remain cryptographically secure for confidentiality using any known methods such as SSL.

Figure 3:
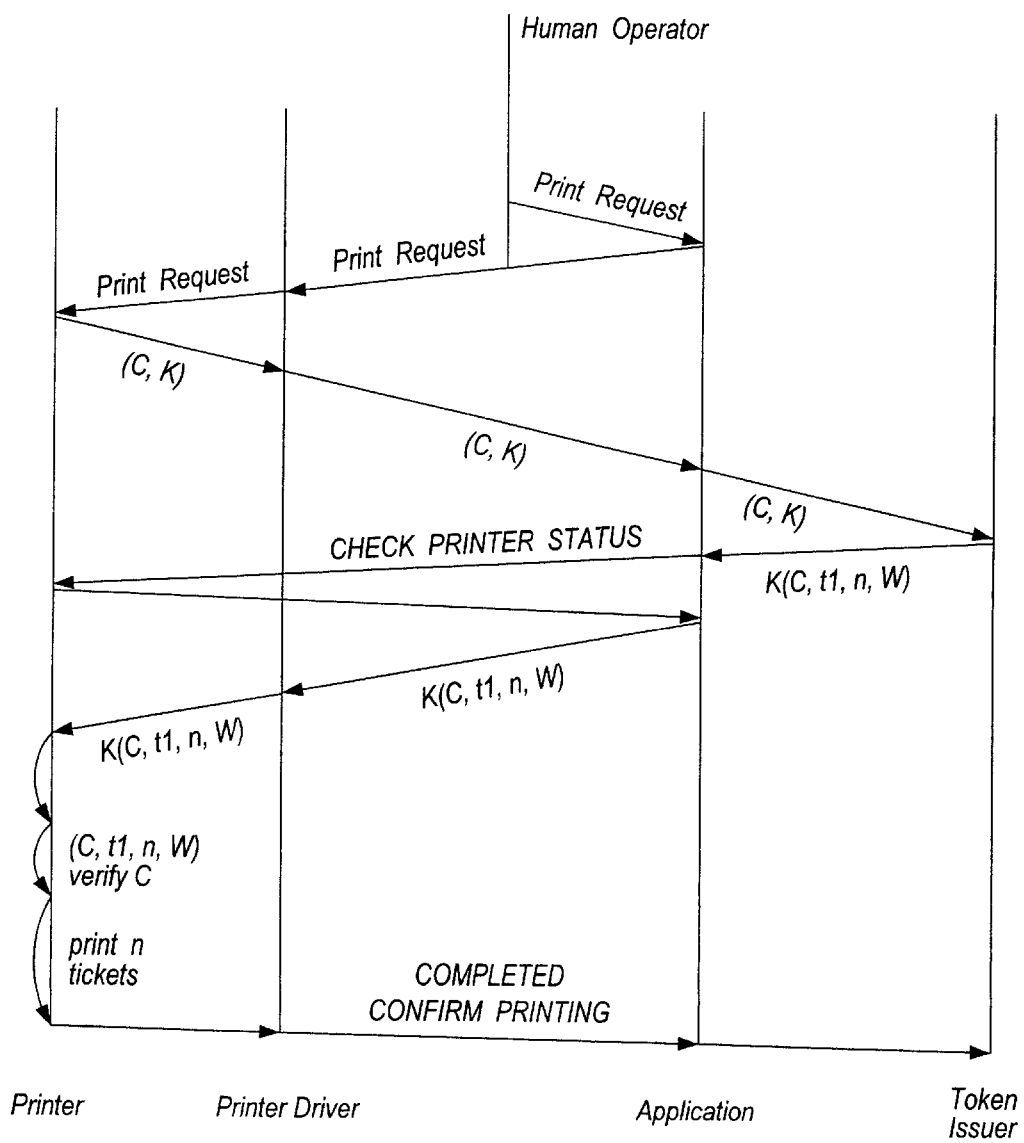
FIG. 3 is a schematic diagram of the method steps of a first embodiment of the invention using the system of FIG. 1.

In the case that the browser 6 has access to a single local printer 1, as in the system of FIG. 1, the following are the steps that are taken to meet the requirements listed previously, the steps being shown in FIG. 3.

The application 3 interacts with the print driver 2, indicating that a trusted printing is to be initiated through the use of, say, a flag. As a result, the printer driver 2 sends a trusted printing notification to the printer 5. In response to the notification, the printer 5 using the PIM 1 sends (C, K) to the driver 2, where C is a newly generated counter number, which the printer 5 will keep as reference for this transaction, and K is the public key for the printer stored in the PIM 1. The driver 2 passes (C, K) to the application 3 which sends this information to the ticket issuer 4. The counter number may be provided as a digitally signed counter number.

Upon receiving (C, K), the issuer 4 uses the public key of the printer 5 to encrypt the text (C, t1), where C is the counter number issued by printer 3 and t1 is the text that represents the ticket to be printed. The public key may be used directly to encrypt the text (C, t1) or it may be used in an enveloping method, such as PKCS No.7, to encrypt a symmetric session key Ks, and in which Ks is then used for encrypting the text (C, t1), for example. In order to avoid the need for the printer to format the ticket for printing, the text could be in postscript, PSL, or raster image, for example, so that a print can be rendered directly without further processing. The avoidance of the use of the print driver ensures that the ticket content is only decrypted inside the printer so enhancing the security of the transaction.

The encrypted text, represented by K(C, t1, n, W) (where n is the number of tickets to be printed and W is watermarking data) is sent back to the application 3. Before passing the encrypted text through the driver 2 to the printer 5, the application 3 checks the management information of the printer 5 to ensure that the printer is ready to render the ticket because it has, for example, adequate toner, paper and so forth. If the printer is ready, the application 3 sends the encrypted text to the printer 5 which uses its private key K' stored in the PIM 1 to decrypt the information.

The printer 5 first checks that the counter value kept by the printer matches C from the decrypted text. Once C is verified, the printer will print t1. If the text sent by the issuer also includes n the number of tickets to be printed, or W the watermarking information, the printer will extract the information and execute printing according to the instruction to print the desired token 9.

Upon completion of the entire ticket printing process by printer 5, an acknowledgement digitally signed by printer 5 is sent to the application 3 and forwarded to the issuer 4. The digitally signed acknowledgement could be all or part of t1 or a reference which the issuer 4 includes in the text sent to the printer 5.

Using the public key of printer 1, the issuer 4 knows for sure that ticket printing has been completed. The issuer 4 will now be able to flag a database 20 that the ticket is now valid or operational, as well as to mark the ticket as sold.

If the computer system 8 has access to several networked printers, as in the system of FIG. 2, it normally prints with the use of a printer spooler 10.

Figure 4:
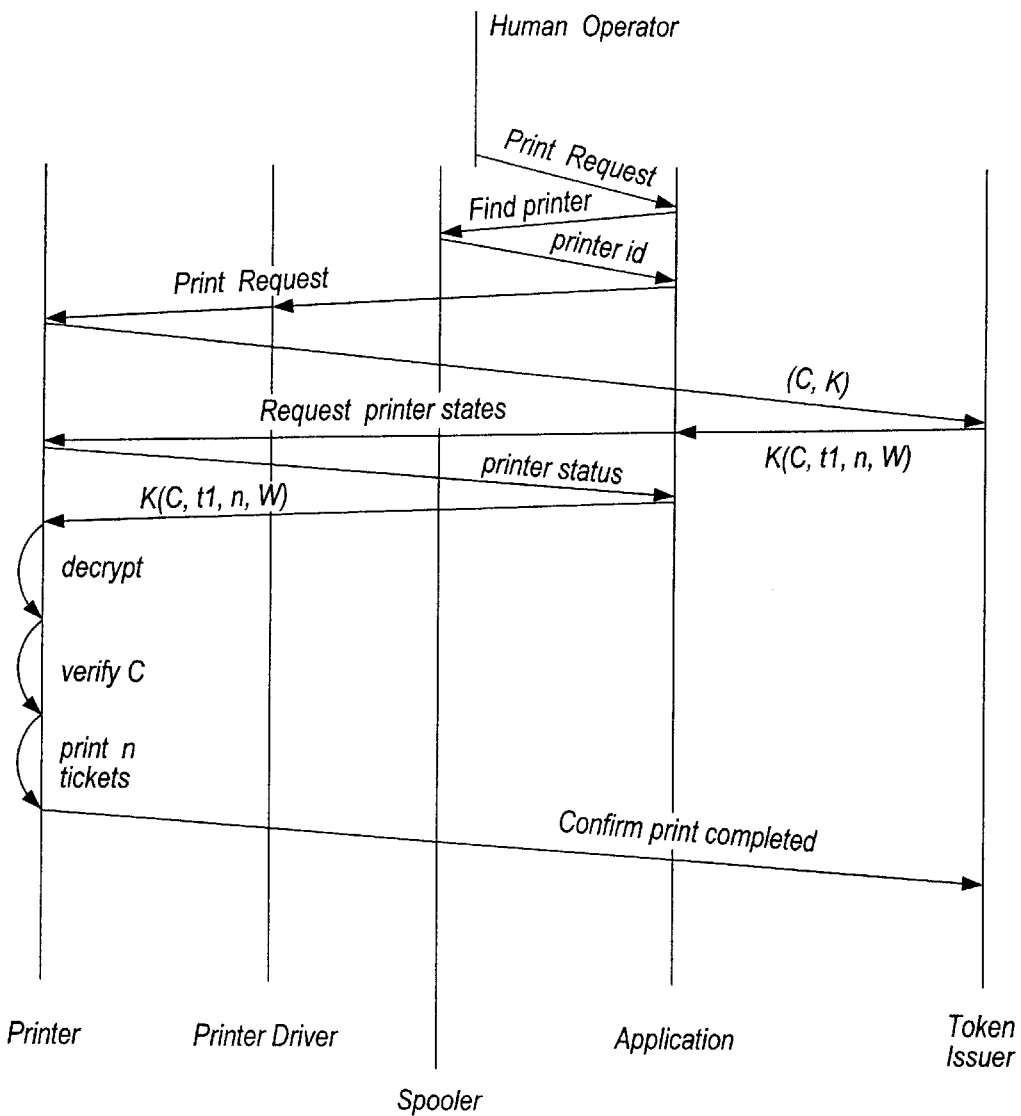
FIG. 4 is a schematic diagram of the method steps of a second embodiment of the invention using the system of FIG. 2.

In the FIG. 4 embodiment of the invention using the system of FIG. 2, the browser 6 connects to the spooler 10 which hosts printer drivers 11A and 11B.

The spooler 10 is used to queue print jobs and enable the print jobs to be done on the selected ones of the designated printers 5, 12, 14 and 16. In this FIG. 2 embodiment, only printers 5 and 12 have their own unique PIM, respectively PIM 1 and PIM 18. They use printer driver 11B, while printers 16 and 10 use driver 11A.

When the human operator 7, who has paid for a ticket from the ticket issuer 4, wants to have the ticket printed immediately, the steps taken to meet the trusted one-time printing requirements are as follows.

The application 3 interacts with the spooler 10 to find out which associated printer is capable of trusted printing. The list of printers with this capability is displayed by the computer system 8 and the human operator 7 can select accordingly.

Suppose printer 5 is chosen. The application 3 initiates trusted printing through, for example, the use of a flag. The spooler 10 uses printer driver 11B to send a trusted printing notification to printer 5.

In response to the notification, printer 5, using the PIM 1, sends (C, K) to the driver 11B, where C is a newly generated counter number, which the printer 5 will keep as reference for this transaction, and K is the public key for the printer 5 stored in the PIM 1. From the driver 11B the spooler 10 takes (C, K) and passes it to the application 3 which will send this information back to the ticket issuer 4.

Upon receiving (C, K), the issuer 4 will use the public key of the printer 5 to encrypt (C, t1), respectively the counter and the formatted ticket text, in exactly the same way as in step 4 in the direct-connect printer case of FIG. 1.

The encrypted text, represented by K(C, t1, n, W) and which depends on the exact implementation, is sent back to the application 3. Before passing the encrypted text through the driver 2 to printer 5, the application 3 checks the management information of the printer 5 to ensure that the printer is ready to render the ticket, as in step 5 in the direct-connect printer case of FIG. 1. If printer 5 is ready, the application 3 will send the encrypted text to the spooler 10 which will pass the encrypted text on to printer 5 which uses its private key K' stored in the PIM 1 to decrypt the information.

The printer 5 first checks that the counter value kept by the printer matches C from the decrypted text. Once C is verified, the printer will print t1. If the text sent by the issuer also includes n the number of tickets to be printed, or W the watermarking information, the printer will extract the information and execute according to the instruction.

Upon completion of the entire ticket printing process by printer 5, an acknowledgement digitally signed by printer 5 is sent to the application 3 and forwarded to the issuer 4. The digitally signed acknowledgement could be all or part of t1, or a reference which the issuer 4 includes in the text sent to the printer 5.

Using the public key of printer 5, the issuer 4 knows for certain that ticket printing has been completed. The issuer 4 will now be able to flag the database 20 that the ticket is now valid or operational, as well as to mark the ticket as sold.

The description of the process so far has focussed on printing with assurance, that is, that the information printed can only be rendered on a specific printer at the point of execution. A printed hard copy on standard office paper can, however, be replicated with the help of a photocopy machine or a scanner and the printer which may not be acceptable to token issuers in some instances.

The trusted one-time printing can involve the use of additional technology to prevent the reproduction of the specific one-time hard copy in such cases. There are several approaches using known technologies including the following.

Physical destructive marking. The printer may be constructed to include a mechanical device which allows the destruction of the paper used to print the ticket. The destruction can take the form of perforation, as found in punch cards, or other forms whereby visible holes are created. Furthermore, the placement of the perforation can be precisely calculated to yield a pattern that is specific to the event related to the ticket. A Superbowl 2000 ticket, for example, could be created with specious pattern which can be verified with the use of a scanning device.

Corrosion-based marking. The printer could have a specious cartridge that allows corrosive liquid or other substance to cause permanent damage to the paper and create a replication resistant marking.

Highly reflective semi-transparent sticky tape could be used. A special complex event logo can be printed on the ordinary paper and a fully sealed cartridge with pieces of highly reflective sticky tape will be overlaid on top. The sticky tape ensures that any attempt to remove it will tear off the even logo, while the highly reflective surface of the semi-transparent sticky tape will resist scanning and photo-copying.

The foregoing description has been limited to the specific embodiments of this invention. It will be apparent however, that variations and modifications may be made to the invention, with the attainment of some or all of the advantages of the invention. Therefore, it is the object of the appended claims to cover all such variations and modifications as come within the true spirit and scope of the present invention.

What is claimed is:

1. A method of printing a token by a printer, in which:
the printer includes a digital identification device configured to generate a series of distinct print job counter numbers and to provide a public key of a cryptographic public key/private key pair, the method including the steps of:
sending a printer-generated print job counter number and an encryption key to a token issuer;

the token issuer sending to the printer a message encrypted by the encryption key, the message including the print job counter number and information representative of the token to be printed; and the printer decrypting the encrypted message and printing the token using the information representative of the token if the print job counter number is valid.

2. The method of claim 1, in which the encrypted message sent from the token issuer includes information representative of the number of tokens to be printed by the printer, each according to the information representative of the token to be printed in the encrypted message.

3. The method of claim 2, in which the printer prints the number of tokens indicated by the information representative of the number of tokens to be printed in the encrypted message.

4. The method of claim 1 in which the encrypted message includes information representative of replication resistant marking applicable to the token.

5. The method of claim 4, in which the printer applies the replication resistant marking to the token.

6. The method of claim 1, in which the printer sends an acknowledgement to the token issuer that the entire printing of the token has been completed.

7. The method of claim 6, in which the acknowledgement is digitally signed using the private key of the printer.

8. The method of claim 6, in which the acknowledgement includes all or part of the information representative of the token to be printed provided by the token issuer.

9. The method of claim 6, in which the acknowledgement is verified by the token issuer and, if found valid, a database is updated to indicate that that token has been issued.

10. The method of claim 1 in which the sending of the messages between the printer and token issuer are mediated by a computer system connected to the printer.

11. The method of claim 10, in which the computer system runs an application and a printer driver.

12. The method of claim 11, in which the token receiver inputs a command to the application indicating a printed token is desired, the application requests the printer, via the printer driver, to provide the print job counter number and the encryption key, the application sends the print job counter number and the encryption key to the token issuer, the application receives the encrypted message from the token issuer and sends it to the printer via the printer driver.

13. The method of claim 1, in which the printer and token issuer are in communication with each other at least in part via the internet.

14. The method of claim 1, in which the printer is also configured to generate data on the printer's attributes which data is sent to the token issuer in addition to the printer-generated print job counter number and the public key.

15. The method of claim 1, in which the print job counter number is digitally signed by the printer.

16. The method of claim 1, in which the encryption key is the printer public key.

17. The method of claim 1, in which the printer public key is presented in the form of a digital certificate signed by the printer manufacturer.

18. The method of claim 1, in which the encryption key is a symmetric session encryption key, the method including using the public key as an enveloping key for sending the symmetric session key to the token issuer securely.

19. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the encrypted message sent from the token issuer includes information representative of the number of tokens to be printed by the printer, each according to the information representative of the token to be printed in the encrypted message.

20. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the encrypted message includes information representative of replication resistant marking applicable to the token.

21. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the printer sends an acknowledgement to the token issuer that the entire printing of the token has been completed.

22. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid;

the printer sends an acknowledgement to the token issuer that the entire printing of the token has been completed; and the acknowledgement is verified by the token issuer and, if found valid, a database is updated to indicate that that token has been issued.

23. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid;

the sending of the messages between the printer and token user being mediated by a computer system connected to the printer;

the computer system running an application and a printer driver, and in which the token receiver inputs a command to the application indicating a printed token is desired, the application requests the printer, via the printer driver, to provide the print job counter number and the encryption key, the application sends the print job counter number and the encryption key to the token issuer, and the application receives the encrypted message from the token issuer and sends it to the printer via the printer driver.

24. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the printer and token issuer are in communication with each other at least in part via the internet.

25. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the printer is also configured to generate data on the printer's attributes which data is sent to the token issuer in addition to the printer-generated print job counter number and public key.

26. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the print job counter number is digitally signed by the printer.

27. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the encryption key is the printer public key.

28. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the printer public key is presented in the form of a digital certificate signed by the printer manufacturer.

29. A method of printing a token by a printer, in which:

the printer includes a digital identification device configured to generate a series of distinct print job counter numbers and to provide a public key of a cryptographic public key/private key pair, the method including the steps of:

sending a printer-generated print job counter number and an encryption key to a token issuer;

the token issuer sending to the printer a message encrypted by the encryption key, the message including the print job counter number and information representative of the token to be printed;

the printer decrypting the encrypted message and printing the token using the information representative of the token if the print job counter number is valid; and the encryption key is a symmetric session encryption key, the method including using the public key as an enveloping key for sending the symmetric session key to the token issuer securely.

* * * * *